Jan. 3, 1956     H. A. JOHNSON     2,729,014
FISHING EQUIPMENT
Filed March 3, 1953
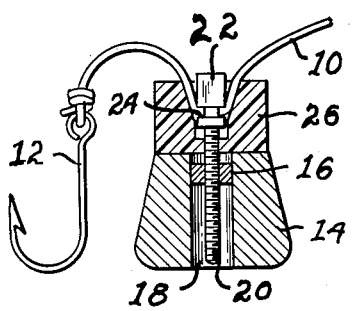
Fig. 1
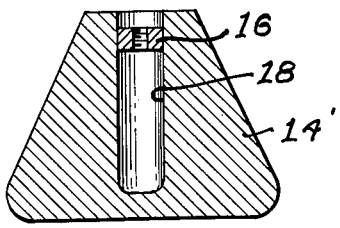
Fig. 4
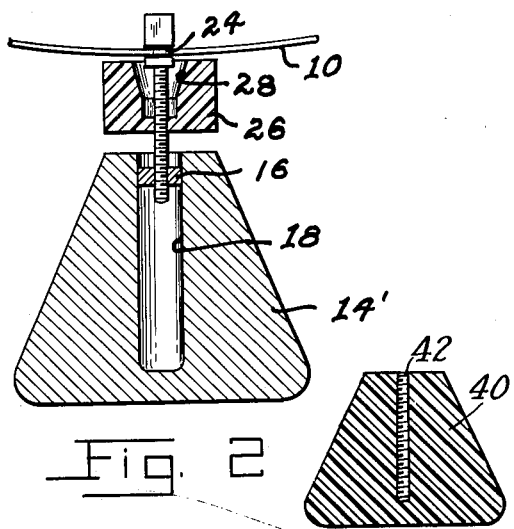
Fig. 2
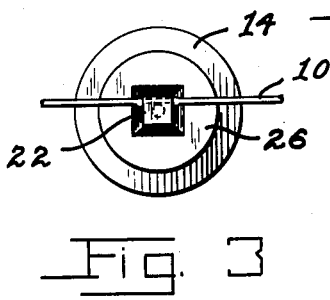
Fig. 3
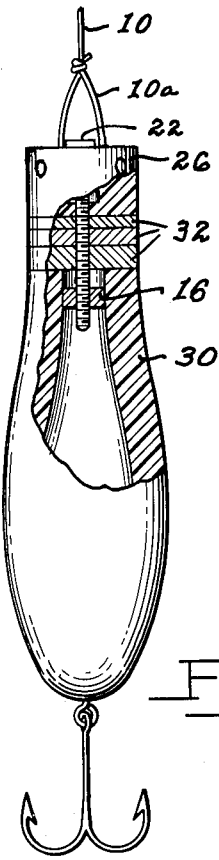
Fig. 6
Fig. 5
INVENTOR.
HOWARD A. JOHNSON.
BY Dybvig & Dybvig
His Attorneys.

United States Patent Office 2,729,014
Patented Jan. 3, 1956

2,729,014

FISHING EQUIPMENT

Howard A. Johnson, Vandalia, Ohio, assignor of one-half to George E. Good, Germantown, Ohio Application March 3, 1953, Serial No. 339,974

5 Claims. (Cl. 43—42.49)

This invention relates to fishing equipment and more particularly to a quick detachable device for interchangeably supporting on a fish line a plurality of different size or shape sinkers or the like.

This application is a continuation-in-part application of my copending application Serial No. 239,944, filed August 2, 1951, for Fishing Equipment, now abandoned.

Most fishermen find it desirable to change the size of the sinker used on a fish line from time to time and various arrangements have been resorted to in the past for facilitating the addition or removal of sinkers on a line. Thus, split shots and the like are extensively used for attaching to the lines, but such devices are not very easy to remove from the line once they are properly secured to the line. In view of the large number of sinkers used from time to time by the average fisherman, it would be impractical to incorporate any complicated attaching means into each sinker, as it would make the cost of the individual sinker prohibitive. It is an object of this invention to provide a new sinker arrangement wherein a single line clamping device may be used to interchangeably support a large number of different size sinkers so that the fisherman needs to invest in only one of the clamping devices and may purchase the weighted part of the sinker at prices comparable to prices charged for conventional sinkers.

It is another object of this invention to provide a line clamping device which may be quickly attached or detached from a fish line without causing injury to the line. It is recognized that a large number of devices have been designed from time to time for removably attaching bobbers and the like to a fish line and that these have operated with various degrees of success, but such prior devices have been limited in their use or have been otherwise objectionable.

While my invention is primarily designed for removably and interchangeably supporting sinker weights of various sizes on a fish line, certain aspects of it are equally applicable for use in attaching other devices such as lures and bobbers. Thus, it is one object of this invention to provide a line clamping device for attaching fishing equipment or implements of various kinds to a fish line in such a manner that an appreciable length of fish line is engaged by the clamping device so as to distribute the strain over a sufficient length of fish line so as not to cause injury to the line.

Still another object of this invention is to provide a device which is applicable for attaching various types of fishing implements to thin lines as well as thick lines.

A further object of this invention is to make it possible to combine in a single unit interchangeable sinkers and/or interchangeable lures. More particularly, it is an object of this invention to provide a device in which the sinker and the lure are combined in such a manner that either can be readily changed.

Other objects and advantages reside in the construction of parts, the combination thereof and the mode of operation, as will become more apparent from the following description.

In the drawing:

Figure 1 is a vertical sectional view showing the invention as applied to a sinker;

Figure 2 is a view similar to Figure 1 but showing the sinker in the process of attachment to a fish line;

Figure 3 is a plan view of the device shown in Figure 1 and illustrating the manner in which the fish line is clamped by the sinker attaching means;

Figure 4 is a detail sectional view showing another size of sinker body removed from the attaching means, which sinker body may be interchanged with the sinker body shown in either Figures 1 or 2; and Figure 5 is an elevational view, with parts broken away, showing the invention used in supporting a combination lure and sinker.

Figure 6 is a cross sectional view of a modification disclosing a plastic main body member having the attaching means removed.

Referring now to the drawing wherein I have shown various embodiments of the invention, reference numeral 10 is used to designate a conventional fish line which is adapted to have attached thereto a fishhook or other suitable fish catching means. For purpose of illustration there is shown in Figure 1 a conventional single barb hook 12 secured to the end of the fish line, whereas it is obvious that other types of hooks and lures could be attached to the line. Figure 1 of the drawing also illustrates the invention as used in securing a sinker weight 14 to the line. The weight 14 may be made of lead or any other suitable material. For purpose of illustrating the invention, I have shown an arrangement in which a threaded metallic nut or insert 16 is cast, molded, or otherwise secured within a central bore 18 provided in the main body of the sinker weight 14. The nut 16 is adapted to removably engage the threaded shank of the line engaging element 20.

The element or screw or bolt 20 is preferably an inexpensive screw machine part which is provided with a head 22 at its upper end as shown. A circular groove 24 is provided in the head 22 for receiving the fish line, as best shown in Figure 2. The width of this groove is enough to accommodate the thickest type of fish lines on which the sinkers are to be used.

A circular sleeve or clamping element 26 is slidably supported on the shank 20 and is provided with a central recess 28 for receiving the head 22 and for clamping the line 10 against the side walls of the head 22, as best shown in Figures 1 and 3. By screwing the sinker weight 14 onto the shank 20, the clamping element or sleeve 26 is forced upwardly so as to forcefully clamp the line 10 against the side walls of the head 22. In order to compensate for differences in thickness of fish lines, the central recess 28 is tapered, with the result that when the device is used with a thick line, the upper portion of the wall of the recess 28 clamps the line against the head 22, whereas when thinner fish lines are used, the sleeve 26 will move up further on the shank 20 and a lower portion of the wall of the recess 28 will serve to clamp the line against the sides of the head 22. For purpose of illustrating the invention, the head 22 and the central aperture or recess 28 have been shown as square in cross section.

The bottom portion of the recess 28 has four perpendicular walls, as viewed in Figures 1 and 2, so that any transverse cross sectional view through the bottom portion of the recess is square. A short distance from the bottom the four walls begin to diverge, the diverging portions of the walls forming what might be referred to as a frustum-pyramidal section. As viewed in Figures 1 and 2, any plane passed horizontally through the tapered portions of the walls results in a square opening. The head 22 is also square and snugly fits within the lower portion of the recess 28, so that member 26 may be used as a hand grip or a socket wrench for turning the head 22 to loosen or tighten the bolt 20.

Member 26 is preferably made from a butyrate plastic, which has a certain amount of give or yield. In other words, it is slightly elastic. This permits the use of fish lines of various sizes. The line 10 is seated in the groove 24 and clamped against the sides of the recess 28. If the line is small and hair-like, the bolt 20 is tightened, so that the head 22 is seated in the bottom of the recess to clamp the line in position, without injury, in that the plastic used in manufacturing member 26 yields sufficiently so as to prevent the line being cut. In the event a heavier line is used, the bolt 20 is tightened so as to clamp the line between the head 22 and a pair of tapered walls of the recess 28.

Instead of being square, the recess 28 might be any regular shaped polygon in cross sectional area and the head 22 a regular polygon of the same number of sides. As a matter of fact, it need not necessarily be a regular polygon, in that the recess 28 and the head 22 could be rectangular. Furthermore, the recess could be circular and the head could be circular; but in that event it would be necessary to provide the head with a tool-engaging portion or a hand-engaging portion to loosen or tighten the element or bolt 20.

By virtue of the arrangement described hereinabove, it is obvious that sinker bodies of various sizes and weights may be interchangeably supported on the line by means of a single clamping element. Thus, a fisherman needs only to buy one clamping element and can buy a number of additional weights of various sizes to be interchangeably used with that clamping element without paying an exorbitant price for each such additional weight. In merchandising the devices, a single clamp would be sold with a plurality of weights of different sizes, so that the fisherman could readily change the size of the weight quickly and easily. Additional weights could be purchased separately from time to time without the need for replacing the attaching clamp.

In Figure 5 of the drawing, a clamping device of the type shown in Figures 1–3 has been shown used for supporting a combined lure and an adjustable sinker. The only difference between the device shown in Figure 1, for example, and the device shown in Figure 5 is that a plastic lure 30 has been substituted for the sinker weight 14 shown in Figure 1 and a plurality of lead or other heavy washers 32 have been provided between the lure and the line clamping sleeve 26. By virtue of the construction shown herein, it is possible to vary the weight of the lure by varying the number of washers 32 mounted between the body of the lure 30 and the sleeve 26. It will be noted that the washers 32 which have been shown for purpose of illustration are of different thicknesses but of the same diameter, with the result that the user will have a greater selection in the choice of weights used with the lure. Thus, if one were fishing in a place where the lure should travel close to the surface, some or all of the weights or washers 32 could be removed so as to cause the lure to float, whereas the deeper one wishes to fish, the more weights or thicker weights would be added between the body of the lure and the sleeve 26.

Attention is called to the fact that the clamping arrangement shown in Figures 1–5 may be used for either clamping onto the line between its ends or it may be used for attaching a lure, for example, to a loop, such as the loop 10a at the very end of the line. When the clamping device is used in the manner illustrated in Figures 1–3, it is a simple matter to slide the clamp up and down on the line so as to obtain the proper relationship between the clamp and the end of the line. As pointed out hereinabove, the clamping device shown herein may be used for attaching various types of devices or fishing implements, such as sinkers, lures and bobbers, to a fish line. The slidable feature is particularly advantageous when the clamp is used for attaching bobbers to the line, as it allows for quickly and positively relocating the float or bobber on the line so as to compensate for differences in fishing depths.

For purpose of illustration, the single lure shown in Figure 5 is a hollow plastic lure having a metallic insert 16, whereas a plurality of interchangeable lures could be used with a single line clamping device and the lures may take any of the various forms and may be made of various types of material. Thus, the lure could be made of a hard plastic material, in which case the metallic insert 16 could be eliminated and a threaded aperture would then be provided directly in the body of the lure, as clearly seen in Figure 6, where member 40 is provided with a threaded aperture 42 adapted to receive and fit the threaded shank of a line engaging element such as the shank 20 shown in Figure 1.

The clamp element or sleeve 26 is preferably made of plastic material, although certain aspects of the invention are equally applicable to devices in which the element 26 is made of any other material. The element 20 could also be made of plastic material, if desired. By using plastic material for one or more of these parts, it is possible to keep the weight of the parts at a minimum so that the weight of the attaching means will not exceed the weight of the smallest sized sinkers one might wish to use. Another advantage of using plastic parts, besides the usual cost advantage, is that the plastic will not cause injury to the line like metallic parts would. This latter advantage is an important one, as the fish lines are usually made as small as possible.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A quick detachable line clamping mechanism for removably attaching a fish line to a fishing implement including an irregular headed bolt having a line engaging annular recess provided in the peripheral surface of its head and a threaded shank, a fishing implement, a threaded member in said implement for receiving the threaded shank, and a line clamping element comprising a sleeve slidable longitudinally on and supported on said shank and having a bolt receiving recess formed therein, the walls of said last mentioned recess being non-circular in cross section and complementary to the shape of the bolt head for preventing relative rotation and arranged at an angle relative to the sides of the bolt so as to accommodate various sizes of lines and being arranged to wedge the fish line against the sides of said bolt head upon the bolt being tightened.

2. A quick detachable line clamping mechanism as set forth in claim 1, wherein the walls of said recess taper inwardly towards the bottom thereof, the lower portion of the recess having its opposite walls extending parallel to each other.

3. A quick detachable mechanism for removably attaching a fish line to a fishing implement including a threaded member adapted to be housed in such implement, a rectangular headed bolt having a line engaging annular recess provided in the peripheral surface of its head and a threaded shank engaging the threaded member, and a sleeve mounted on said shank and slidable longitudinally thereon between the bolt head and said threaded member and having a recess therein forming a socket to receive said bolt head and in which said head is adapted to be non-rotatably seated, the walls of said socket being disposed at an angle relative to the sides of said bolt head to accommodate various sizes of fish line and being arranged to wedge the line against said sides by relative rotation of said threaded member with respect to said bolt.

4. A quick detachable mechanism for removably attaching a fish line to a sinker selected from a plurality of sinkers of various sizes, said mechanism including a threaded member adapted to be housed in said sinker, a rectangular headed bolt having a line engaging annular recess provided in the peripheral surface of its head and a threaded shank engaging the threaded member, and a sleeve mounted on said shank and slidable longitudinally thereon between the bolt head and said threaded member and having a recess therein forming a socket to receive said bolt head and in which said head is adapted to be non-rotatably seated, the walls of said socket being disposed at an angle relative to the sides of said bolt head to accommodate various sizes of fish line and being arranged to wedge the line against said sides by relative rotation of said threaded member with respect to said bolt.

5. A quick detachable mechanism according to claim 3 wherein the bolt head is substantially rectangular and wherein the bolt head receiving recess is substantially rectangular.

References Cited in the file of this patent

UNITED STATES PATENTS

| | | |
|---|---|---|
| 77,774 | Smith | May 12, 1868 |
| 549,332 | Sewell | Nov. 5, 1895 |
| 870,242 | Meech | Nov. 5, 1907 |
| 1,307,340 | Benedict | June 24, 1919 |
| 2,255,793 | Kridler | Sept. 16, 1941 |
| 2,316,074 | Kimbrough | Apr. 6, 1943 |